(12) United States Patent
Safar

(10) Patent No.: US 10,884,500 B2
(45) Date of Patent: Jan. 5, 2021

(54) ELECTRONIC DISPLAY SCREEN WITH DYNAMIC TOPOGRAPHY

(71) Applicant: Samir Hanna Safar, San Diego, CA (US)

(72) Inventor: Samir Hanna Safar, San Diego, CA (US)

(73) Assignee: Samir Hanna Safar, San Diego, CA (US)

( * ) Notice: Subject to any disclaimer, the term of this patent is extended or adjusted under 35 U.S.C. 154(b) by 129 days.

(21) Appl. No.: 16/011,644

(22) Filed: Jun. 19, 2018

(65) Prior Publication Data
US 2019/0384401 A1 Dec. 19, 2019

(51) Int. Cl.
*G06F 3/01* (2006.01)
*G06F 3/041* (2006.01)
*G06F 3/02* (2006.01)
*G06F 3/0484* (2013.01)

(52) U.S. Cl.
CPC ............ *G06F 3/016* (2013.01); *G06F 3/0202* (2013.01); *G06F 3/0412* (2013.01); *G06F 3/0416* (2013.01); *G06F 3/04842* (2013.01)

(58) Field of Classification Search
CPC ...... G06F 3/016; G06F 3/0412; G06F 3/0202; G06F 3/04842; G06F 3/0416
See application file for complete search history.

(56) References Cited

U.S. PATENT DOCUMENTS

| | | | | |
|---|---|---|---|---|
| 6,509,892 B1* | 1/2003 | Cooper | ................... | G06F 3/011 345/173 |
| 8,047,849 B2* | 11/2011 | Ahn | ...................... | G09B 21/004 434/114 |
| 9,285,841 B2* | 3/2016 | Bolzmacher | ............ | G06F 3/041 |
| 9,672,701 B2* | 6/2017 | Evreinov | ............. | A61B 5/0531 |
| 9,760,241 B1* | 9/2017 | Lewbel | .................... | G06F 3/041 |
| 9,965,066 B2* | 5/2018 | Zhang | ................... | G06F 3/0482 |
| 10,240,688 B2* | 3/2019 | Besse | .................. | F16K 99/0015 |
| 2005/0098044 A1* | 5/2005 | Spedden | .............. | G09B 21/004 99/325 |
| 2005/0285846 A1* | 12/2005 | Funaki | ................ | G06F 3/04886 345/173 |
| 2010/0162109 A1* | 6/2010 | Chatterjee | ........... | G06F 3/04886 715/702 |
| 2012/0299905 A1* | 11/2012 | Roselier | ................... | G06F 3/016 345/214 |
| 2013/0166046 A1* | 6/2013 | Kubota | .................. | B60K 35/00 700/83 |

(Continued)

*Primary Examiner* — Amy Onyekaba
(74) *Attorney, Agent, or Firm* — Samir Hanna Safar

(57) ABSTRACT

The present invention relates to an electronic screen display device capable of providing a haptic feedback to a user by dynamically altering the screen topography in response to a user choice. The electronic display screen includes a movable top layer, a base layer, a plurality of nodes embedded on said base layer, a plurality of micromuscle fibre cell units correspondingly affixed on said plurality of nodes at one end, and affixed on the top layer at an opposing end, wherein each micromuscle fibre cell unit further includes at least one micromuscle fibre positioned enclosed within a flexible polymeric casing with a cavity, and capable of contraction or elongation on passing of electric current, wherein change in the height of the micromuscle fibre cell unit causes the movable top layer to be vertically displaced.

16 Claims, 6 Drawing Sheets

(56) References Cited

U.S. PATENT DOCUMENTS

| | | | |
|---|---|---|---|
| 2013/0187875 A1* | 7/2013 | Matsuoka | G06F 3/016 345/173 |
| 2013/0303981 A1* | 11/2013 | Kizhakkedathu | A61L 31/048 604/95.05 |
| 2016/0011684 A1* | 1/2016 | Zhang | G06F 3/016 345/173 |
| 2018/0143689 A1* | 5/2018 | Heubel | G06F 3/041 |

* cited by examiner

ELECTRONIC DISPLAY SCREEN WITH DYNAMIC TOPOGRAPHY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The present invention belongs to the field of display devices, and more particularly relates to electronic screen display units for devices such as a communication device, or a computing device, wherein the screen is capable of dynamically altering the topography of the display based on a user's input and choice.

BACKGROUND OF THE INVENTION

Electronic display screens are being provided with increasing functionalities to offer an intuitive, comprehensive and novel experience to a user. These include advances in touchscreens, and haptic display devices to cater to various tactile inputs, which are natural, easy to use and provide an informative interface. These needs are particularly important in software applications involving games, simulations, tactile input programs such as e-braille programs, augmented reality applications.

One of the limitations of the current display devices is that a user is not able to have a visually satisfying experience, such that the display screen is dynamically altered to provide a three-dimensional appearance and feel. Moreover, the existing devices rely on a main user input in form of touch or similar tactile input, or an audio input.

Therefore there is a need for a display screen that provides a visually satisfying experience to a user by dynamically altering the topography of screen as per the user's choice, which is provided programmatically as a non-tactile input.

Further, there is also a need for a display screen wherein the topography of the screen is altered as per the user's choice within a short response time, and without consuming significant additional energy.

Below are given some of the known prior art.

U.S. Pat. No. 6,429,846 titled "Haptic feedback for touchpads and other touch controls" discloses a haptic feedback planar touch control used to provide input to a computer. A touch input device includes a planar touch surface that inputs a position signal to a processor of the computer based on a location of user contact on the touch surface. The computer can position a cursor in a displayed graphical environment based at least in part on the position signal, or perform a different function. At least one actuator is also coupled to the touch input device and outputs a force to provide a haptic sensation to the user contacting the touch surface. The touch input device can be a touchpad separate from the computer's display screen, or can be a touch screen. Output haptic sensations on the touch input device can include pulses, vibrations, and spatial textures. The touch input device can include multiple different regions to control different computer functions.

EP Patent Application EP3108343 titled "Haptic display with simultaneous sensing and actuation" discloses touch interface devices and methods for producing multi-point haptics utilizing simultaneous sensing and actuation are disclosed. In one configuration, one or more electrodes connected to a front surface of a substrate are arranged in a pattern and connected to an electronic controller configured to produce a haptic effect by applying one or more voltages to the electrodes, and measure the locations of one or more touch points by applying one or more voltages to the electrodes. In another configuration the electronic controller is configured to produce a haptic effect by applying positive and/or negative voltages to the electrodes, and measure the locations of one or more touch points by applying positive and/or negative voltages to the electrodes. Also disclosed is a method for using a single set of electrodes on a substrate of a touch interface to simultaneously produce haptic effects on the substrate and measure finger locations relative to the substrate.

U.S. Pat. No. 9,734,403 titled "Augmented reality display of dynamic target object information" discloses a method for providing target object information to a mobile device user is presented. The method includes receiving a request for target object information from a mobile device, determining the pose of the mobile interface device relative to the target object, and obtaining target object data for one or more measurable target object parameters (e.g., surface topography). The target object data is used to assemble augmented reality information configured for viewing in conjunction with a real-time view of the target object captured by the mobile interface device. The target object augmented reality information is then transmitted to the mobile device for display to the user.

U.S. Pat. No. 9,600,070 describes a user interface having changeable topography. The user interface can have a shape changeable surface that can selectively alter according to an input so as to provide changeable topography of the user interface. The surface can include individual nodes that can raise above or lower below the initial surface. Alternatively, the surface can include a shape changeable material that can change the shape of portions thereof into discrete shapes above or below the initial surface. Alternatively, the surface can include a deformable material that can deform portions thereof into discrete forms above or below the initial surface. The changeable topography can define different user interface layouts. The user interface can, for example, be associated with input and/or output devices, such as touch pads, touch screens, and the like.

Despite various improvements and progress in the field, some of the major challenges continue to remain, mainly that of providing a display screen which is capable of being dynamically altered as per a user's choice provided as a non-tactile input. None of the existing devices can alter the screen to provide a haptic feedback to the user within such a short response time and without any significant additional energy consumption. Further, some of the presently known display devices can only alter the screen to a few limited positions.

Accordingly, improvements are needed in the existing methods and devices that negate the above shortcomings in the existing systems.

The purpose and methodology of all the above inventions that are part of prior art do not envisage the unique embodiment of an electronic display screen that can have a dynamically altered topography based on a non-tactile user input.

The scope of the invention is to be determined by the terminology of the following description, claims, drawings and the legal equivalents thereof.

SUMMARY OF THE INVENTION

The present invention may be summarized, at least in part, with reference to its objects.

It is therefore a primary objective of the present invention to provide a display screen device that is capable of being dynamically altered as per a user's choice provided programmatically as a non-tactile input.

Another objective of the present invention is to provide a display screen device that can alter the screen to provide a haptic feedback to the user.

A further objective of the present invention is to provide a display screen device that can dynamically alter the screen within a short response time and without any significant energy consumption.

The invention described herein is a novel electronic display screen, capable of providing a haptic feedback to a user by dynamically altering the screen topography in response to a user choice, the dynamically altering including: receiving the user choice for activating the screen topography;
determining an initial height of a graphic element;
sending signal to a node corresponding to the graphic element;
activating a node controller corresponding to said node;
determining amount of current to be passed in each micromuscle fibre so as to vary length of the micromuscle fibre; and accordingly,
passing the predetermined amount of electric current in a micromuscle fibre unit corresponding to said node so as to dynamically and continuously alter the initial height of the graphic element;
wherein said nodes are configured to not detect any touch event.

Further, the invention described herein is a novel electronic display screen, capable of providing a haptic feedback to a user by dynamically altering the screen topography in response to a user choice, the electronic display screen comprising:
a movable top layer,
a base layer,
a plurality of nodes embedded on said base layer,
a plurality of micromuscle fibre cell units correspondingly affixed on said plurality of nodes at one end, and affixed on the top layer at an opposing end, wherein each micromuscle fibre cell unit further comprises:
at least one micromuscle fibre positioned enclosed within a flexible polymeric casing with a cavity, and capable of contraction or elongation on passing of electric current, wherein change in the height of the micromuscle fibre cell unit causes the movable top layer to be vertically displaced.

The above summary is intended to illustrate exemplary embodiments of the invention, which will be best understood in conjunction with the detailed description to follow, and are not intended to limit the scope of the invention.

Additional objects and embodiments of the invention will be set forth in part in the description which follows, and in part will become apparent to those skilled in the art upon examination of the following, or may be learned by practice of the invention. Thus these and other objects of the present invention will be more readily apparent when considered in reference to the following description and when taken in conjunction with the accompanying drawings.

The above summary is intended to illustrate exemplary embodiments of the invention, which will be best understood in conjunction with the detailed description to follow, and are not intended to limit the scope of the invention.

Additional objects and embodiments of the invention will be set forth in part in the description which follows, and in part will become apparent to those skilled in the art upon examination of the following, or may be learned by practice of the invention. Thus these and other objects of the present invention will be more readily apparent when considered in reference to the following description and when taken in conjunction with the accompanying drawings.

Figure 1:
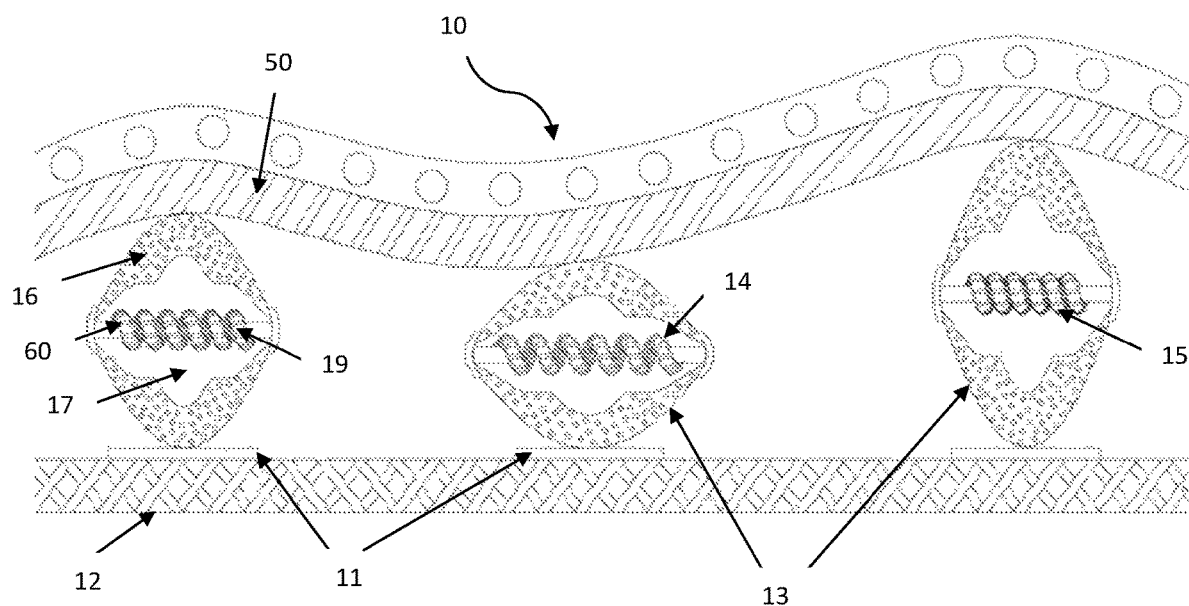
FIG. 1 is an illustrative diagram depicting a cross sectional view of the electronic display screen in a first embodiment of the present invention, wherein the display screen has an altered topography.

It should be understood that drawings are for the purpose of illustrating the concepts of the invention and are not to scale.

LIST OF REFERENCE NUMBERING 10 labels an electronic display screen capable of dynamically altering screen topography
11 labels a plurality of nodes
12 labels a base layer
13 labels a plurality of micromuscle fibre cell units in a first embodiment of the invention
14 labels a micromuscle fibre in a horizontal elongated configuration
15 labels a micromuscle fibre in a horizontal contracted configuration
16 labels a flexible polymeric casing
17 labels a cavity within the flexible polymeric casing
18 labels a plurality of micromuscle fibre cell units in a second embodiment of the invention
19 labels a micromuscle fibre in a horizontal normal configuration, corresponding to a first embodiment of the invention
20 labels a micromuscle fibre in a vertical normal configuration, corresponding to a second embodiment of the invention
21 labels a plurality of hemispherical domes in a second embodiment of the invention
22 labels a micromuscle fibre in a vertical elongated configuration, corresponding to a second embodiment of the invention
23 labels a micromuscle fibre in a vertical contracted configuration, corresponding to a second embodiment of the invention
24 labels a plurality of micromuscle fibre cell units in a vertical elongated configuration, corresponding to a third embodiment of the invention
25 labels a plurality of supporting micromuscle fibre cell units in a vertical configuration, corresponding to a third embodiment of the invention
26 labels a plurality of supporting micromuscle fibre cell units in a vertical normal configuration, corresponding to a third embodiment of the invention
27 labels a plurality of micromuscle fibre cell units in a horizontal normal configuration, corresponding to a fourth embodiment of the invention
28 labels a plurality of supporting micromuscle fibers in a horizontal normal configuration, corresponding to a fourth embodiment of the invention
29 labels a plurality of micromuscle fibers in a horizontal normal configuration, corresponding to a fourth embodiment of the invention
30 labels a plurality of micromuscle fibers in a horizontal expanded configuration, corresponding to a fourth embodiment of the invention
31 labels a plurality of micromuscle fibers in a horizontal contracted configuration, corresponding to a fourth embodiment of the invention
32 labels a plurality of supporting micromuscle fibers in a horizontal normal configuration, corresponding to a fourth embodiment of the invention
40 labels an electronic device
50 labels a top layer
60 labels a micro current controller

DETAILED DESCRIPTION OF THE INVENTION

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

The following description is presented to enable any person skilled in the art to make and use the invention, and is provided in the context of particular applications of the invention and their requirements.

"Micromuscle fibre" as used in the context of the present patent application refers to artificial muscle fibres as described herein below.

Reference is made to "artificial muscles" as described in the publication "New twist on artificial muscles" by Carter S. Haines et al in PNAS, Mar. 13, 2018, vol. 115, no. 11. Reference is also made to "artificial muscles" as described in the publication "Experimental characterization of thermally-activated artificial muscles based on coiled nylon fishing lines" by Antonello Cherubini et al in AIP Advances.

Wires made from shape memory alloys have seen use as artificial muscles. Shape memory polymers may also be used as artificial muscle fibers. A host of other materials and actuation processes for example, piezoelectric ceramics and polymers, electrostatic actuators based on deformable capacitors, electrochemically doped conducting polymers, and cantilever based ionic-polymer metal composites can also be considered. In recent years, a new class of muscles has emerged based on highly twisted fibers. Twisted and coiled Carbon NanoTube (CNT) yarns have provided unprecedented torsional and tensile work capacities, but the high cost of fabricating these CNT fibers has limited their application. In this area, a key breakthrough came with the development of polymer-based twisted fibre muscles. These artificial muscle fibers could be easily fabricated by simply twisting widely available, lowcost materials like fishing line and sewing thread.

The present invention is described with reference to accompanying figures. While the invention is described with reference to four main embodiments, several combinations may be possible imbibing the same concepts.

With reference to FIG. 1, an illustrative diagram depicting a cross sectional view of the electronic display screen in a first embodiment of the present invention, wherein the display screen has an altered topography, is shown. 10 denotes an electronic display screen having a dynamically altering screen topography. 11 denotes a plurality of electrically or thermally conducting nodes, affixed on a base layer 12. Each node is coupled to a node controller. A plurality of micromuscle fibre cell units 13 are preferably non-removably affixed on a plurality of nodes 11, respectively. Adhesive means may be used for non-removable affixation. A top layer 50 holds the micromuscle fibre cell units from the top. Each micromuscle fibre cell unit 13 comprises of a flexible polymeric casing 16, enclosed within which is a cavity 17. A micromuscle fibre in a horizontal normal configuration, is present in each cavity 17. A predetermined amount of electric current is transmitted to each code. Each micromuscle fibre contracts, or expands corresponding the amount of electric current that passes through it. The electric current is passed on to each micromuscle fibre by a micro current controller 60 which is a conducting wire having very thin diameter. A micro current controller 60 is spirally wound around a micromuscle fibre.

Accordingly the height of the micromuscle fibre cell unit is altered, thereby causing change in the screen topography.

In FIG. 1, 14 depicts a micromuscle fibre in a horizontal elongated configuration, 15 depicts a micromuscle fibre in a horizontal contracted configuration and 19 depicts a micromuscle fibre in a horizontal normal configuration.

Figure 2:
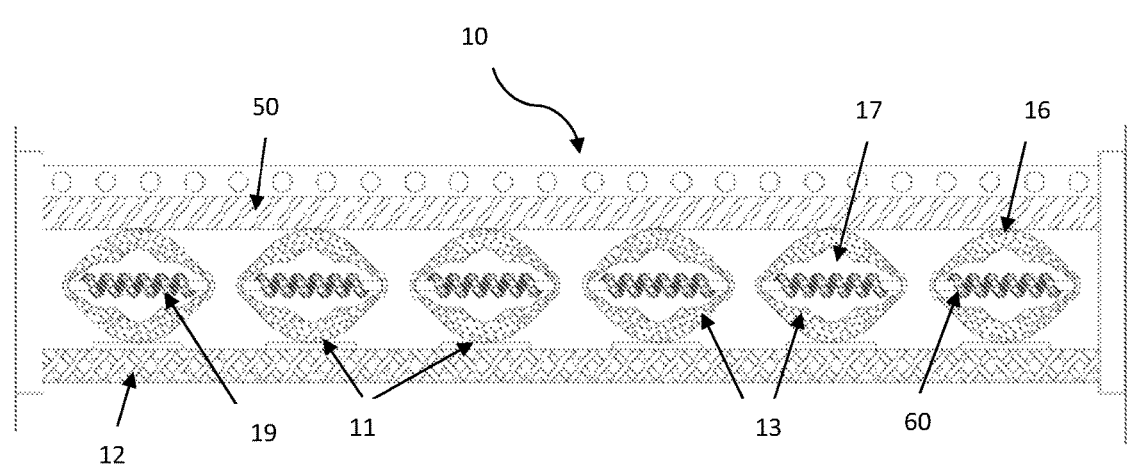
FIG. 2 is an illustrative diagram depicting a cross sectional view of the electronic display screen in a first embodiment of the present invention, wherein the display screen has a uniform topography.

With reference to FIG. 2, an illustrative diagram depicting a cross sectional view of the electronic display screen in a first embodiment of the present invention, wherein the display screen has a uniform topography, is shown. 10 denotes an electronic display screen having a uniform screen topography. 11 denotes a plurality of electrically or thermally conducting nodes, affixed on a base layer 12. A plurality of micromuscle fibre cell units 13 are affixed on a plurality of nodes 11, respectively. Each micromuscle fibre cell unit comprises of a flexible polymeric casing 16, enclosed within which is a cavity 17. A micromuscle fibre in a horizontal normal configuration, is present in each cavity 17.

A predetermined amount of electric current is transmitted to each code. Each micromuscle fibre contracts, or expands corresponding the amount of electric current that passes through it. The electric current is passed on to each micromuscle fibre by a micro current controller 60 which is a conducting wire having very thin diameter. A micro current controller 60 is spirally wound around a micromuscle fibre. As shown in FIG. 2, equal current is passed through each micromuscle fibre cell unit and hence all the micromuscle fibre cell units are of equal height. 19 depicts a micromuscle fibre in a horizontal normal configuration.

Figure 3:
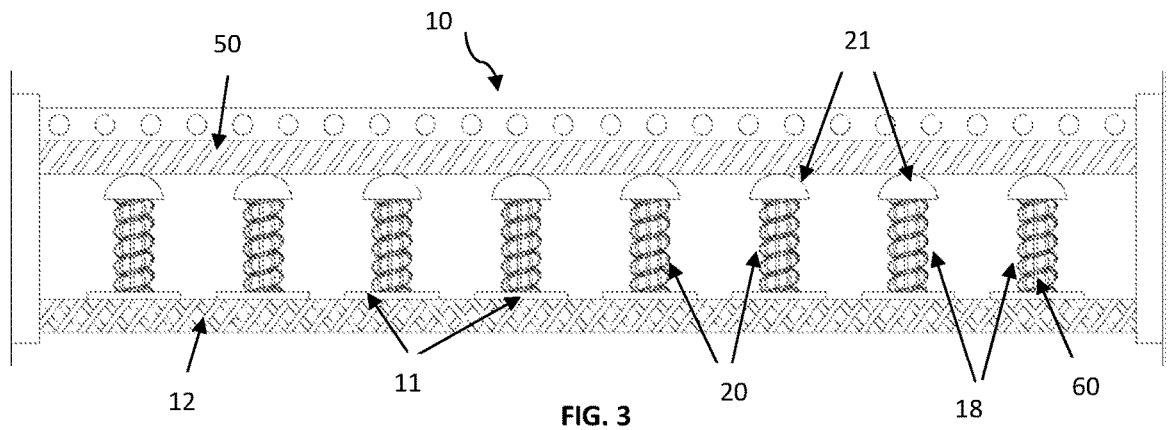
FIG. 3 is an illustrative diagram depicting a cross sectional view of the electronic display screen in a second embodiment of the present invention, wherein the display screen has a uniform topography.
Figure 4:
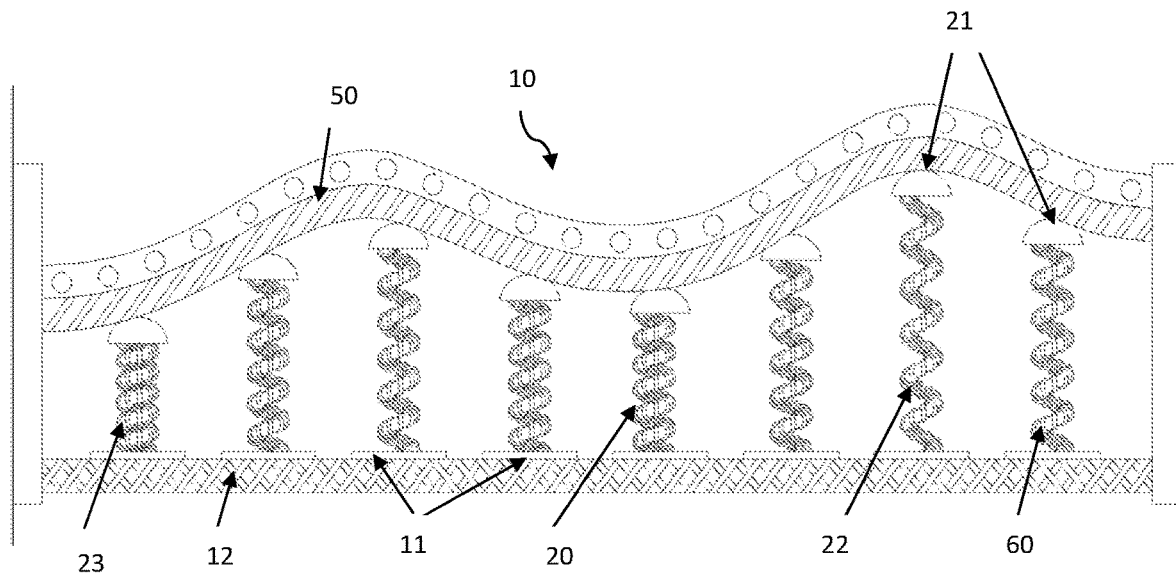
FIG. 4 is an illustrative diagram depicting a cross sectional view of the electronic display screen in a second embodiment of the present invention, wherein the display screen has an altered topography.

FIGS. 3 and 4 depict an alternate embodiment of the present invention, referred to as a second embodiment in this application. Referring to FIG. 3, which is an illustrative diagram depicting a cross sectional view of the electronic display screen in a second embodiment of the present invention, wherein the display screen has a uniform topography and referring to FIG. 4, which is an illustrative diagram depicting a cross sectional view of the electronic display screen in a second embodiment of the present invention, wherein the display screen has an altered topography.

While in the first embodiment, each micromuscle fibre is positioned horizontally, in the second embodiment, each micromuscle fibre is positioned vertically.

Referring to FIG. 3, 10 denotes an electronic display screen having a uniform screen topography. 11 denotes a plurality of electrically or thermally conducting nodes, affixed on a base layer 12. A plurality of micromuscle fibre cell units 18 are affixed on a plurality of nodes 11, respectively. A top layer 50 holds the micromuscle fibre cell units from the top. Each micromuscle fibre cell unit 18 comprises of a micromuscle fibre 20 in a vertical normal configuration, having a hemispherical dome 21 at its upper end. A predetermined amount of electric current is transmitted to each code, which corresponds to a specific height of each micromuscle fibre. As shown in FIG. 3, equal current is passed through each micromuscle fibre cell unit and hence all the micromuscle fibre cell units are of equal height. 20 depicts a micromuscle fibre in a vertical normal configuration. The electric current is passed on to each micromuscle fibre by a micro current controller 60 which is a conducting wire having very thin diameter. A micro current controller 60 is spirally wound around a micromuscle fibre.

With reference to FIG. 4, 10 denotes an electronic display screen having a dynamically altering screen topography. 11 denotes a plurality of electrically or thermally conducting nodes, affixed on a base layer 12. A plurality of micromuscle fibre cell units is affixed on a plurality of nodes 11, respectively. A top layer 50 holds the micromuscle fibre cell units from the top. A predetermined amount of electric current is transmitted to each code. Each micromuscle fibre contracts, or expands corresponding the amount of electric current that passes through it. Accordingly the height of the micromuscle fibre cell unit is altered, thereby causing change in the screen topography. The electric current is passed on to each micromuscle fibre by a micro current controller 60 which is a conducting wire having very thin diameter. A micro current controller 60 is spirally wound around a micromuscle fibre.

In FIG. 4, 22 depicts a micromuscle fibre in a vertical elongated configuration, 23 depicts a micromuscle fibre in a vertical contracted configuration and 20 depicts a micromuscle fibre in a vertical normal configuration.

Figure 5:
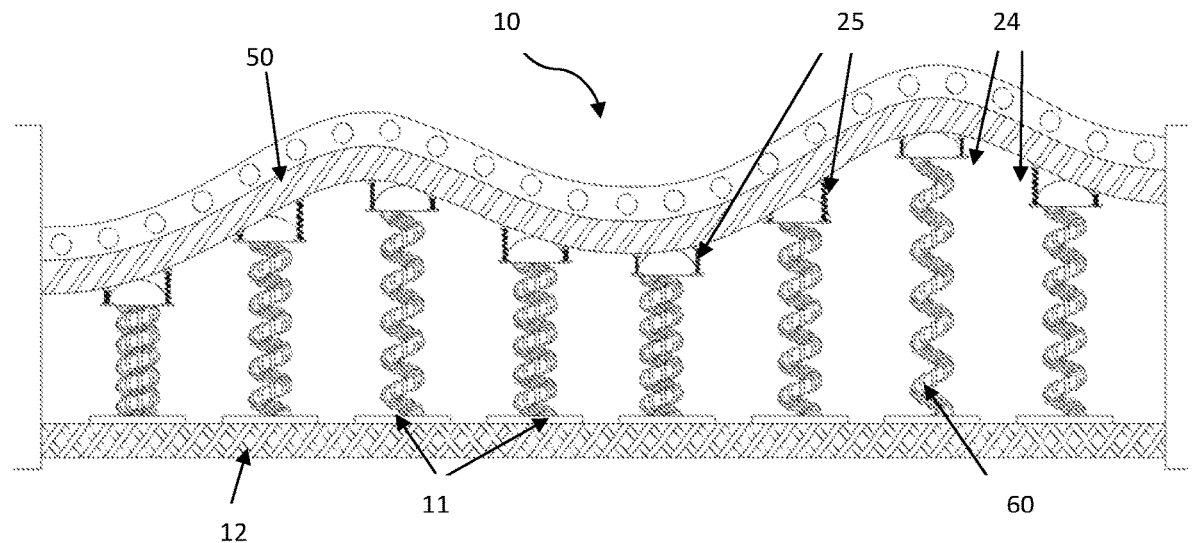
FIG. 5 is an illustrative diagram depicting a partial sectional view of the electronic display screen in a third embodiment of the present invention, wherein the display screen has an altered topography.
Figure 6:
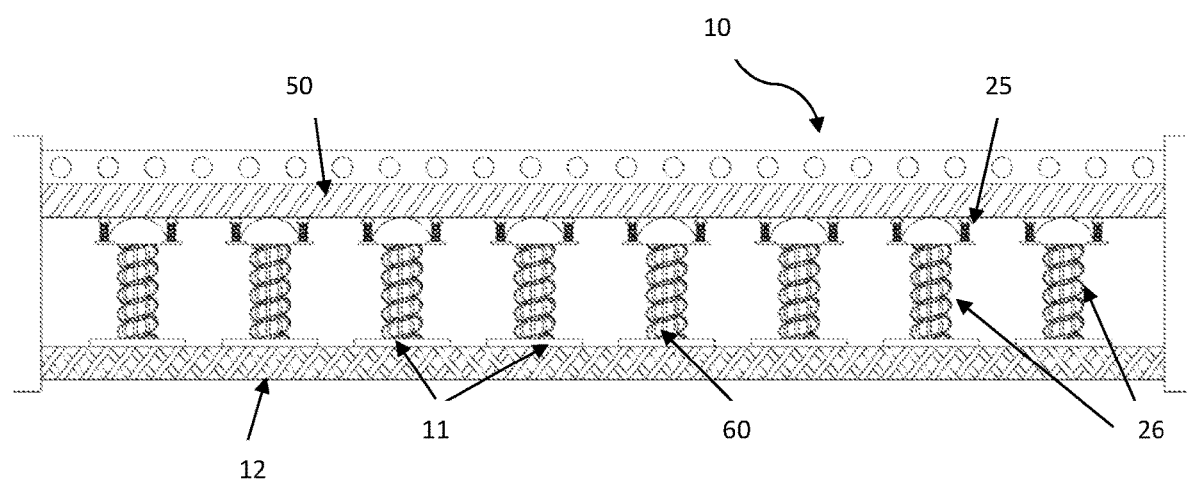
FIG. 6 is an illustrative diagram depicting a partial sectional view of the electronic display screen in a third embodiment of the present invention, wherein the display screen has a uniform topography.

FIGS. 5 and 6, correspond to an alternate embodiment, referred to as a third embodiment of the present invention. FIG. 5 an illustrative diagram depicting a partial sectional view of the electronic display screen in a third embodiment, wherein the display screen has an altered topography, while FIG. 6 is an illustrative diagram depicting a partial sectional view of the electronic display screen in a third embodiment, wherein the display screen has a uniform topography.

Referring to FIG. 5, 10 denotes an electronic display screen having a dynamically altering screen topography. 11 denotes a plurality of electrically or thermally conducting nodes, affixed on a base layer 12. A plurality of micromuscle fibre cell units 18 are affixed on a plurality of nodes 11, respectively. A top layer 50 holds the micromuscle fibre cell units from the top. Each micromuscle fibre cell unit 24 comprises of a micromuscle fibre in a vertical normal configuration, having a hemispherical dome at its upper end. In addition, a plurality of supporting micromuscle fibre cell units in a vertical configuration, denoted by 25, are provided at the upper end of the micromuscle fibre for finer control over the screen displacement. A predetermined amount of electric current is transmitted to each code, which corresponds to a specific height of each micromuscle fibre. Each micromuscle fibre contracts, or expands corresponding the amount of electric current that passes through it. The electric current is passed on to each micromuscle fibre by a micro current controller 60 which is a conducting wire having very thin diameter. A micro current controller 60 is spirally wound around a micromuscle fibre. Accordingly the height of the micromuscle fibre cell unit is altered, thereby causing change in the screen topography.

With reference to FIG. 6, 10 denotes an electronic display screen having a uniform screen topography. 11 denotes a plurality of electrically or thermally conducting nodes, affixed on a base layer 12. A plurality of micromuscle fibre cell units are affixed on a plurality of nodes 11, respectively. A top layer 50 holds the micromuscle fibre cell units from the top. 26 depicts a plurality of micromuscle fibers in a vertical normal configuration, wherein each micromuscle fibre is supported by a plurality of supporting micromuscle fibre cell units 25. As shown in FIG. 6, equal current is passed through each micromuscle fibre cell unit and hence all the micromuscle fibre cell units are of equal height. The electric current is passed on to each micromuscle fibre by a micro current controller 60 which is a conducting wire having very thin diameter. A micro current controller 60 is spirally wound around a micromuscle fibre.

Figure 7:
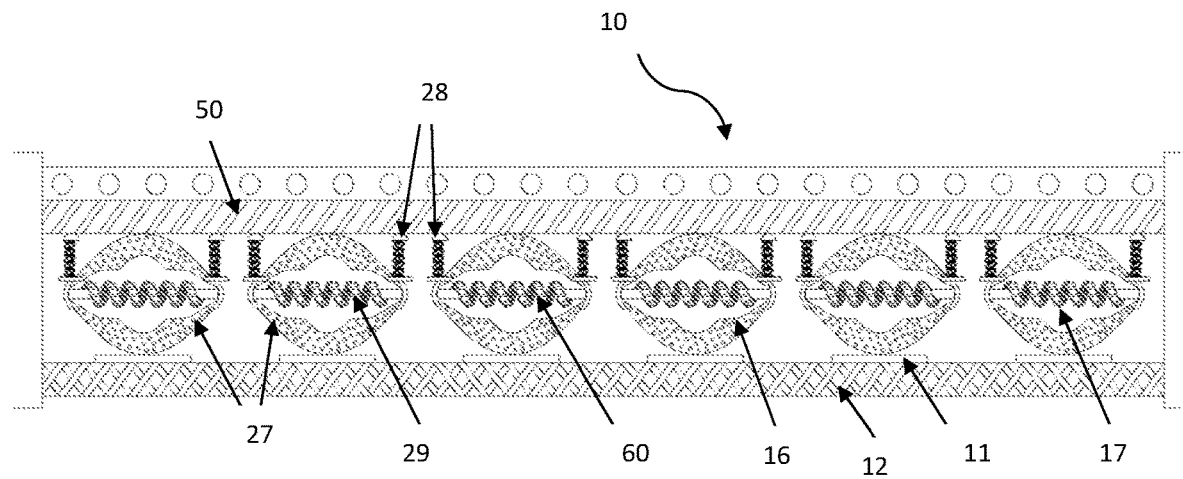
FIG. 7 is an illustrative diagram depicting a partial sectional view of the electronic display screen in a fourth embodiment of the present invention, wherein the display screen has a uniform topography.
Figure 8:
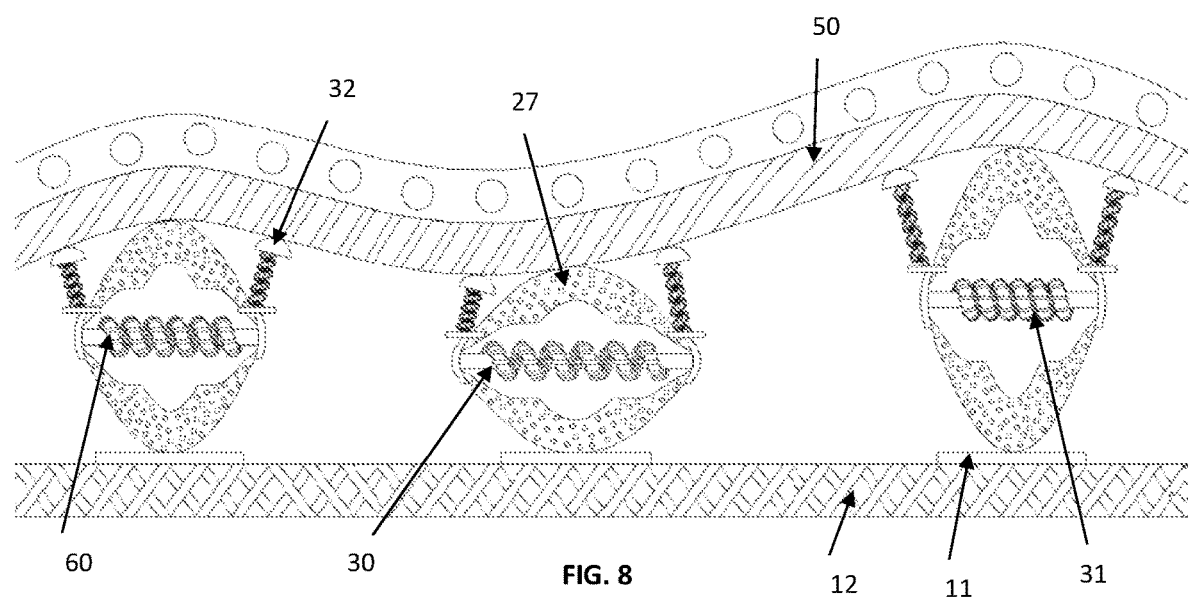
FIG. 8 is an illustrative diagram depicting a partial sectional view of the electronic display screen in a fourth embodiment of the present invention, wherein the display screen has an altered topography.

FIGS. 7 and 8, correspond to an alternate embodiment, referred to as a fourth embodiment of the present invention. FIG. 7 is an illustrative diagram depicting a partial sectional view of the electronic display screen in a fourth embodiment, wherein the display screen has an uniform topography, while FIG. 8 is an illustrative diagram depicting a partial sectional view of the electronic display screen in a fourth embodiment, wherein the display screen has an altered topography.

Referring to FIG. 7, 10 denotes an electronic display screen having a dynamically altering screen topography. 11 denotes a plurality of electrically or thermally conducting nodes, affixed on a base layer 12. Each node is coupled to a node controller. A plurality of micromuscle fibre cell units 13 are preferably non-removably affixed on a plurality of nodes 11, respectively. Adhesive means may be used for non-removable affixation. A top layer 50 holds the micromuscle fibre cell units from the top. Each micromuscle fibre cell unit 27 comprises of a flexible polymeric casing 16, enclosed within which is a cavity 17. A micromuscle fibre 29 in a horizontal normal configuration, is present in each cavity 17. A predetermined amount of electric current is transmitted to each code. Each micromuscle fibre contracts, or expands corresponding the amount of electric current that passes through it. The electric current is passed on to each micromuscle fibre by a micro current controller 60 which is a conducting wire having very thin diameter. A micro current controller 60 is spirally wound around a micromuscle fibre. In addition, a plurality of supporting micromuscle fibre cell units in a vertical configuration, denoted by 28, are provided at the upper end of the micromuscle fibre cell unit 27, for finer control over the screen displacement.

With reference to FIG. 8, 10 denotes an electronic display screen having a uniform screen topography. 11 denotes a plurality of electrically or thermally conducting nodes, affixed on a base layer 12. Each node is coupled to a node controller. A plurality of micromuscle fibre cell units 13 are preferably non-removably affixed on a plurality of nodes 11, respectively. Adhesive means may be used for non-removable affixation. A top layer 50 holds the micromuscle fibre cell units from the top. Each micromuscle fibre cell unit 27 comprises of a flexible polymeric casing 16, enclosed within which is a cavity 17. A micromuscle fibre 29 in a horizontal normal configuration, is present in each cavity 17. A predetermined amount of electric current is transmitted to each code. Each micromuscle fibre contracts, or expands corresponding the amount of electric current that passes through it. The electric current is passed on to each micromuscle fibre by a micro current controller 60 which is a conducting wire having very thin diameter. A micro current controller 60 is spirally wound around a micromuscle fibre. In addition, a plurality of supporting micromuscle fibre cell units in a vertical configuration, denoted by 28, are provided at the upper end of the micromuscle fibre cell unit 27, for finer control over the screen displacement.

Figure 9:
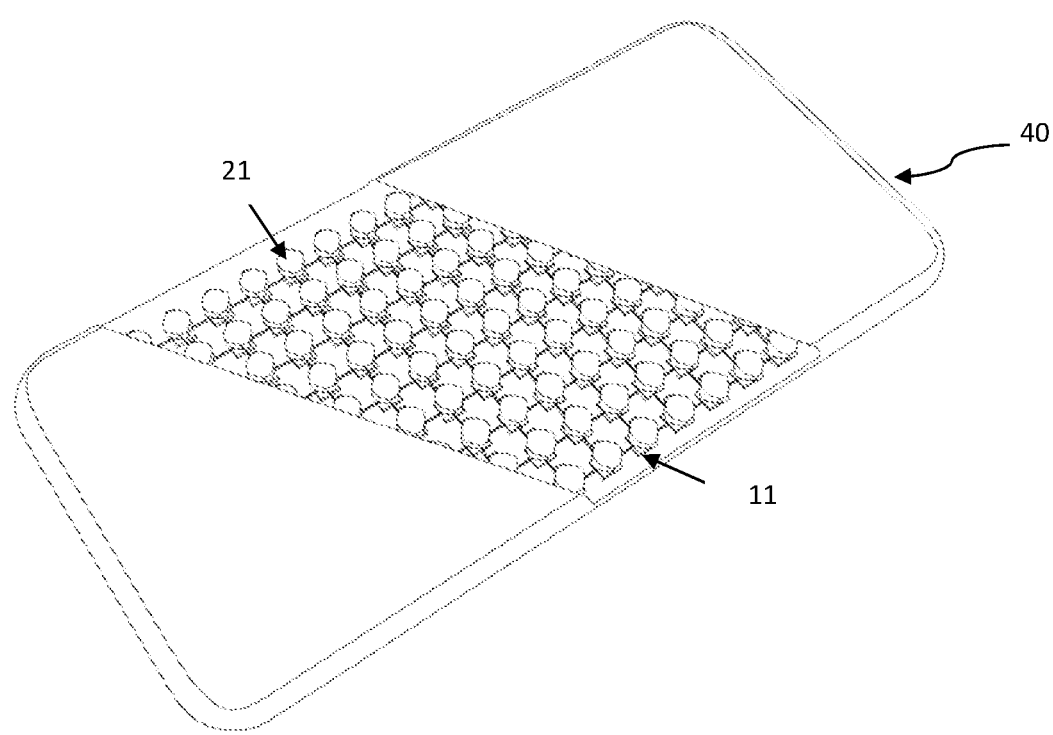
FIG. 9 is an illustrative diagram depicting a partial sectional view of the electronic display screen in a second embodiment of the present invention.

Referring to FIG. 9, which depicts a partial sectional view of the electronic display screen in a second embodiment of the present invention. An electronic device 40 is shown, having a plurality of nodes 11 spread out as a matrix. A plurality of hemispherical domes 21 are laid over each micromuscle fibre cell unit, corresponding to each node.

Figure 10:
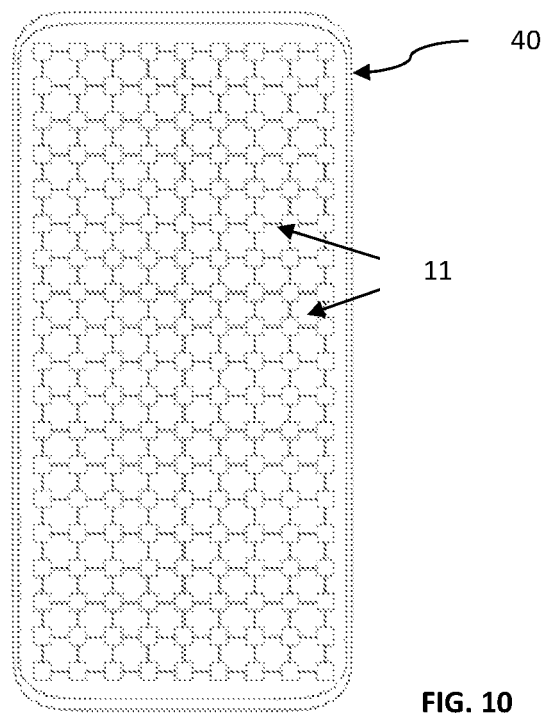
FIG. 10 is an illustrative diagram depicting a partial sectional view of the electronic display screen in a first embodiment of the present invention.

Referring to FIG. 10, which depicts a partial sectional view of the electronic display screen in a first embodiment of the present invention. An electronic device 40 is shown, having a plurality of nodes 11 spread out as a matrix.

Figure 11:
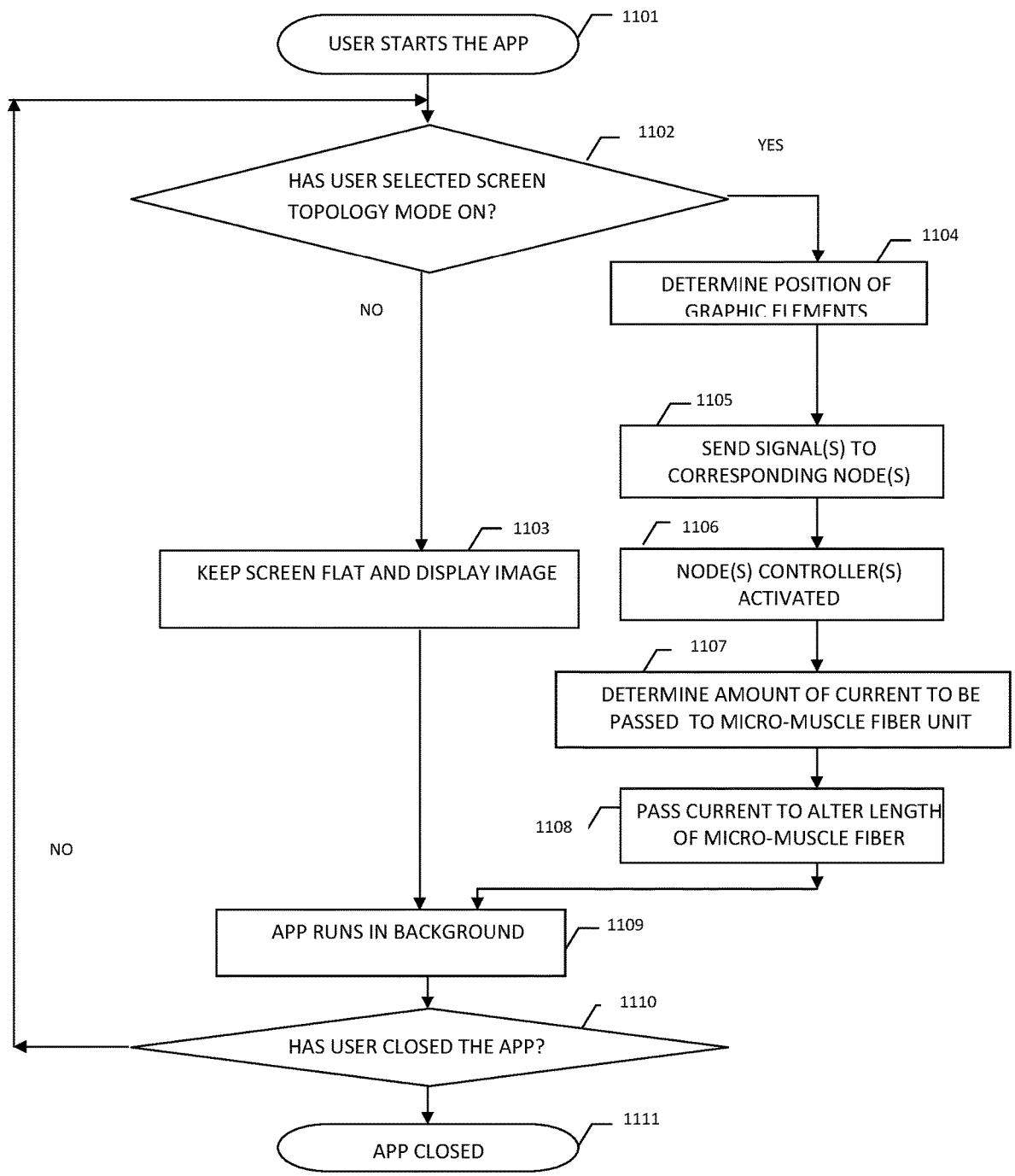
FIG. 11 is an illustrative flow chart depicting the sequence of important steps in an embodiment of the present invention.

FIG. 11 depicts an example methodology illustrating the steps followed in one embodiment of the invention. It is to be understood and appreciated that the present invention is not limited by order of steps and that some of the steps may occur in different order and/or concurrently with other steps from that illustrated here. At step 1101, the user starts the application residing in the electronic communication device ("app"). At step 1102, the app determines whether the user has selected the screen topology mode or the screen non-topology mode. Based on the user choice, if the screen topology mode has not been selected at step 1103, the display screen is kept flat and a normal image is displayed. Based on the user choice, if the screen topology mode has been selected at step 1102, then step 1104, the positions of the graphic elements are determined. At step 1105, signals are sent to nodes corresponding to the graphic elements. At step 1106, the node controllers get activated. At step 1107, the amount of current to be passed to each micromuscle fibre unit is determined. At step 1108, the determined amount of current is passed to alter the length of the micromuscle fibre. Then at step 1109, the app runs in the background and it is determined if the user has closed the app. Based on the user choice, the app is closed at step 1110.

Accordingly the present invention in a main embodiment is a novel electronic screen display device that is capable of providing a haptic feedback to a user by dynamically altering the screen topography in response to a user choice, the dynamically altering including:

receiving the user choice for activating the screen topography;

determining an initial height of a graphic element;

sending signal to a node corresponding to the graphic element;

activating a node controller corresponding to said node;

determining amount of current to be passed in each micromuscle fibre so as to vary length of the micromuscle fibre; and accordingly, passing the predetermined amount of electric current in a micromuscle fibre unit corresponding to said node so as to dynamically and continuously alter the initial height of the graphic element;

wherein said nodes are configured to not detect any touch event.

Further, the invention described herein is a novel electronic display screen, capable of providing a haptic feedback to a user by dynamically altering the screen topography in response to a user choice, the electronic display screen comprising:

a movable top layer, a base layer, a plurality of nodes embedded on said base layer, a plurality of micromuscle fibre cell units correspondingly affixed on said plurality of nodes at one end, and affixed on the top layer at an opposing end, wherein each micromuscle fibre cell unit further comprises:

at least one micromuscle fibre positioned enclosed within a flexible polymeric casing with a cavity, and capable of contraction or elongation on passing of electric current, wherein change in the height of the micromuscle fibre cell unit causes the movable top layer to be vertically displaced.

The electric current is passed to the micromuscle fibre by a corresponding micro current controller, which is provided in the form of a thin conducting wire and is spirally wound around the micromuscle fibre.

In an alternate embodiment, the micromuscle fibre cell units of the first and the fourth embodiments have a predefined ratio of volume of cavity to volume of flexible polymeric casing.

In an alternate embodiment, each micromuscle fibre cell unit is provided in the form of a single micromuscle fibre having a hemispherical dome at an upper end.

In an alternate embodiment, each micromuscle fibre cell unit is provided with a plurality of supporting micromuscle fibers for a fine control over the displacement of the top layer.

In alternate embodiments of the present invention, the entire assembly of the micromuscle fibre is provided and assembled using removable, fastenable means such as by micro snap-on fastening devices that can rotates 360 degree, micro hooks, or rings.

In alternate embodiments of the present invention, the entire assembly of the micromuscle fibre is provided and assembled using removable, fastenable means as well as non-removable adhesive means.

In alternate embodiments, shape memory materials are used as preferred material of construction for the micromuscle fibre cell unit and the micromuscle fibre so as to help in the restoring the micromuscle fibre and/or the micromuscle fibre cell unit back to its original shape to save the electrical energy that is needed to revert to original dimensions.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

In this application, the terminology 'embodiment' can be used to describe any aspect, feature, process or step, any combination thereof, and/or any portion thereof, etc.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

I claim:

1. An electronic screen display device that is capable of providing a haptic feedback to a user by dynamically altering the screen topography in response to a user choice, the dynamically altering including: receiving the user choice for activating the screen topography as a non-tactile input; determining an initial height of a graphic element; sending signal to a node corresponding to the graphic element; activating a node controller corresponding to said node; determining amount of current to be passed in each micromuscle fibre so as to vary length of the micromuscle fibre; and accordingly, passing the determined amount of electric current in a micromuscle fibre unit corresponding to said node so as to dynamically and continuously alter the initial height of the graphic element; wherein said nodes are configured to not detect any touch event; wherein the electronic screen display device comprises: a movable top layer, a base layer, a plurality of nodes including the node corresponding to the graphic element embedded on said base layer, a plurality of micromuscle fibre cell units correspondingly affixed on said plurality of nodes at one end, and affixed on the top layer at an opposing end.

2. An electronic screen display device, as claimed in claim 1, wherein each micromuscle fibre is supported by a plurality of supporting micromuscle fibers for control over the displacement of the top layer.

3. An electronic screen display device, as claimed in claim 2, wherein each micromuscle fibre is supported by a plurality of supporting micromuscle fibers in a vertical configuration for control over the displacement of the top layer.

4. An electronic screen display device, as claimed in any of the claim 1 or 2, wherein the micromuscle fibre cell units have a predefined ratio of volume of cavity to volume of flexible polymeric casing.

5. An electronic screen display device, as claimed in any of the claim 1 or 2-4, wherein the micromuscle fibres are made of a shape memory material.

6. An electronic screen display device, as claimed in any of the claim 1 or 2-5, wherein electric current is passed on to each micromuscle fibre by way of a thin, conducting wire spirally wound around the micromuscle fibre.

7. An electronic screen display device, as claimed in any of the claim 1 or 2-5, wherein the plurality of supporting micromuscle fibre cell units are provided in a vertical configuration.

8. An electronic screen display device, capable of providing a haptic feedback to a user by dynamically altering the screen topography in response to a user choice for activating the screen topography as a non-tactile input the electronic screen display device comprising: a movable top layer, a base layer, a plurality of nodes embedded on said base layer, a plurality of micromuscle fibre cell units correspondingly affixed on said plurality of nodes at one end, and affixed on the top layer at an opposing end, wherein each micromuscle fibre cell unit further comprises: at least one micromuscle fibre horizontally positioned and enclosed within a flexible polymeric casing with a cavity, and capable of contraction or elongation on passing of electric current, wherein change in the height of the micromuscle fibre cell unit causes the movable top layer to be vertically displaced.

9. An electronic screen display device, capable of providing a haptic feedback to a user by dynamically altering the screen topography in response to a user choice for activating the screen topography as a non-tactile input, the electronic screen display device comprising: a movable top layer, a base layer, a plurality of nodes embedded on said base layer, a plurality of micromuscle fibre cell units correspondingly affixed on said plurality of nodes at one end, and affixed on the top layer at an opposing end, wherein each micromuscle fibre cell unit further comprises of a single vertically positioned micromuscle fibre, having a hemispherical dome at its upper end, and capable of contraction or elongation on passing of electric current, wherein change in the height of the micromuscle fibre cell unit causes the movable top layer to be vertically displaced.

10. An electronic screen display device, capable of providing a haptic feedback to a user by dynamically altering the screen topography in response to a non-tactile user choice for activating the screen topography, the electronic screen display device comprising: a movable top layer, a base layer, a plurality of nodes embedded on said base layer, a plurality of micromuscle fibre cell units correspondingly affixed on said plurality of nodes at one end, and affixed on the top layer at an opposing end, wherein each micromuscle fibre cell unit further comprises: at least one micromuscle fibre horizontally positioned and enclosed within a flexible polymeric casing with a cavity, and capable of contraction or elongation on passing of electric current, and having a plurality of supporting micromuscle fibre cell units in a vertical configuration, wherein change in the height of the micromuscle fibre cell unit causes the movable top layer to be vertically displaced.

11. An electronic screen display device, as claimed in claim 10, wherein each micromuscle fibre is supported by a pair of supporting micromuscle fibers in a vertical configuration for control over the displacement of the top layer.

12. An electronic screen display device, as claimed in any of the claims 10-11, wherein the plurality of micromuscle fibre cell units have a predefined ratio of volume of cavity to volume of flexible polymeric casing.

13. An electronic screen display device, as claimed in any of the claims 10-12, wherein the micromuscle fibres are made of a shape memory material.

14. An electronic screen display device, as claimed in any of the claims 10-13, wherein electric current is passed on to each micromuscle fibre by way of a thin, conducting wire spirally wound around the micromuscle fibre.

15. An electronic screen display device, as claimed in any of the claims 10-14, wherein the plurality of micromuscle fibre cell units non-removably affixed on the plurality of nodes.

16. An electronic screen display device, as claimed in any of the claims 10-15, wherein the non-tactile user choice is provided by the user through an application residing in an electronic communication device.

\* \* \* \* \*